Sept. 11, 1934.   J. W. TATTER ET AL   1,973,584
RAFT
Filed Dec. 15, 1930   3 Sheets-Sheet 1
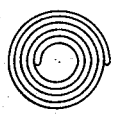
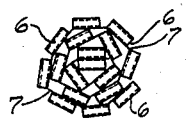
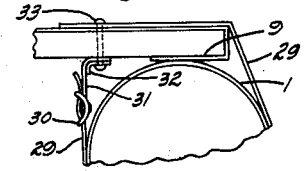
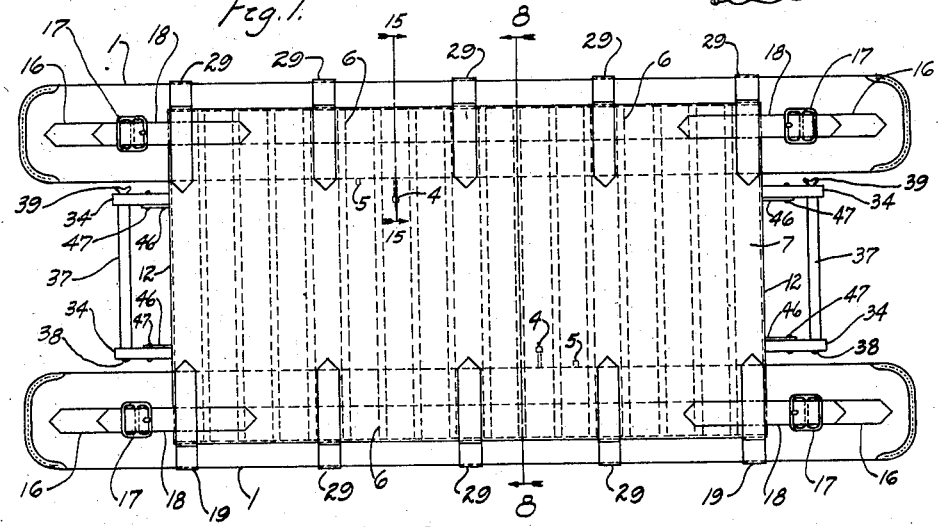
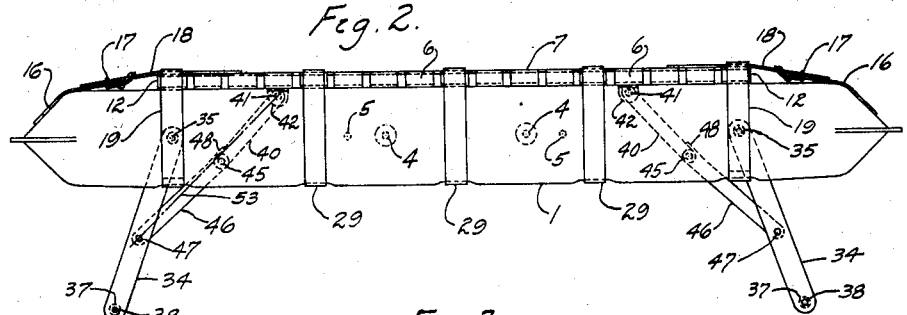
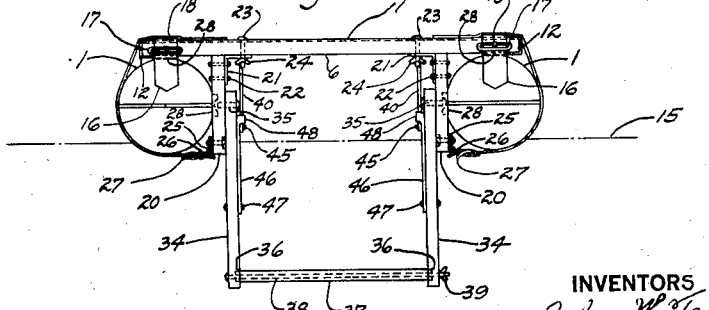
INVENTORS
John W. Tatter
and
George B. Ingersoll Sept. 11, 1934.  J. W. TATTER ET AL  1,973,584
RAFT
Filed Dec. 15, 1930   3 Sheets-Sheet 2
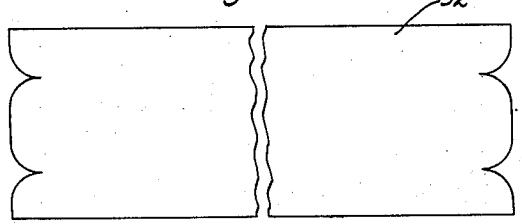
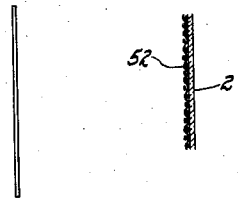
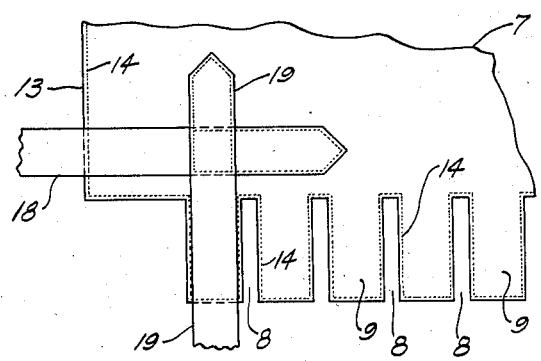
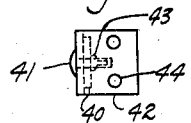
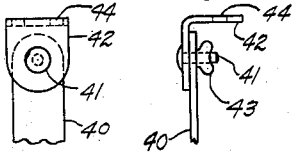
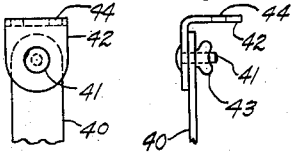
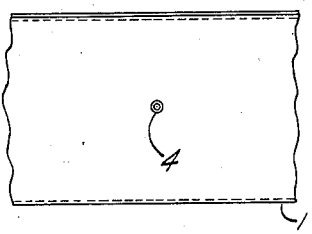
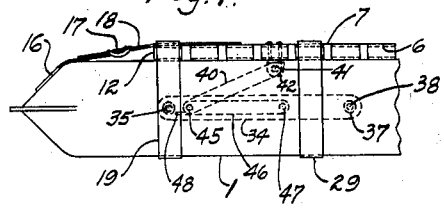
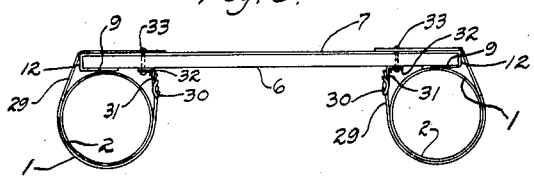
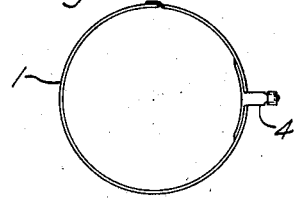
INVENTORS
John W. Tatter
and
George B. Ingersoll

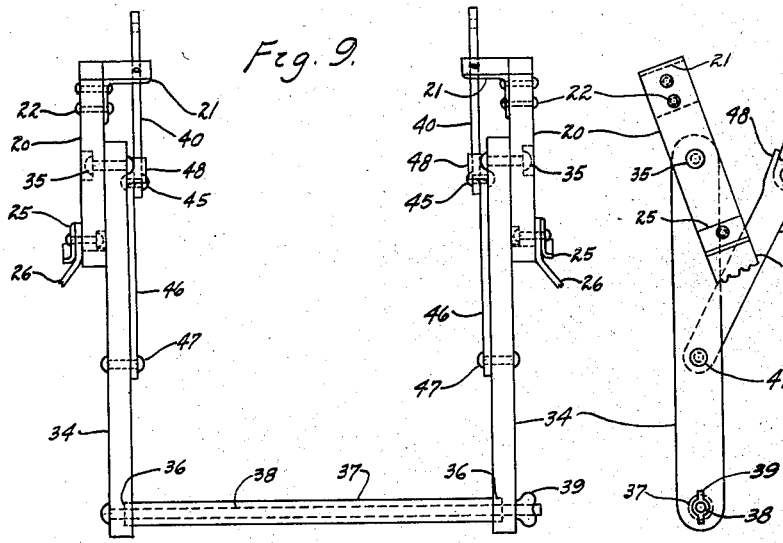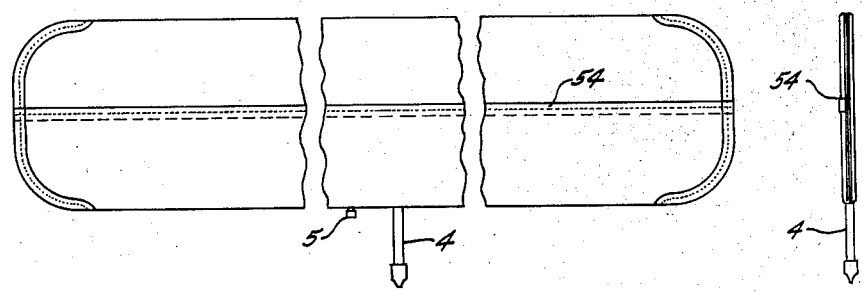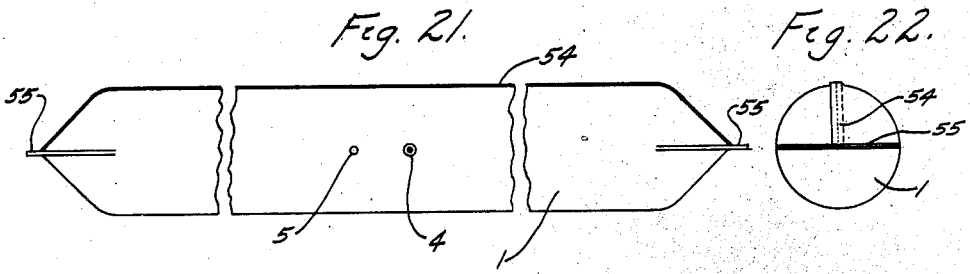

Patented Sept. 11, 1934

1,973,584

UNITED STATES PATENT OFFICE 1,973,584

RAFT

John W. Tatter, Detroit, and George B. Ingersoll, Dearborn, Mich.; said Ingersoll assignor to Ella I. Ingersoll, Dearborn, Mich.

Application December 15, 1930, Serial No. 502,410

29 Claims. (Cl. 9—11)

Our invention relates to improvements in rafts for swimming and diving purposes; and the objects of our improvement are, first, to provide a raft that is exceptionally light in weight; second, to provide a raft that is readily disassembled for compact packing purposes; third, to provide a raft having its platform members spaced and retained by a fabric member; fourth, to provide a raft having a folding ladder means; fifth, to provide a raft that is stable with unevenly distributed loads thereon; fifth, to provide a raft having container members with integral rubber composition air tubes; and sixth, to provide a raft having its deck located adjacent its pneumatic supporting members.

We attain these objects by the mechanism illustrated in the accompanying drawings, in which—

Figure 1 is a plan view of the assembled raft; Fig. 2, a side elevation of the assembled raft; Fig. 3, an end elevation of the assembled raft; Fig. 4, a view of one of the container casings and integral air tubes in a rolled position; Fig. 5, an end view of the platform members, together with its canvas cover, in its folded position; Fig. 6, a portion of the platform canvas member together with a portion of its straps; Fig. 7, a partial view of the raft with its ladder mechanism folded; Fig. 8, a sectional view of the raft without its ladder mechanism taken on the line 8—8, Fig. 1; Fig. 9, a front elevation of the detached ladder mechanism; Fig. 10, a side elevation of the detached ladder mechanism; Fig. 11, a plan view of one of the ladder attaching clamps and a portion of one of the brackets mounted thereon; Fig. 12, a side elevation of the parts disclosed in Fig. 11; Fig. 13, a front elevation of the parts disclosed in Fig. 11; Fig. 14, a partial view of one of the containers and integral air tubes; Fig. 15, a sectional view of one of containers and integral air tubes taken on the line 15—15, Fig. 1; Fig. 16, a plan view of the fabric, with integral rubber lining, used for constructing the pneumatic tubes; Fig. 17, a side elevation of the fabric as disclosed in Fig. 16; Fig. 18, an enlarged sectional view of a portion of one of the pneumatic tubes; Fig. 19, a plan view of one of the pneumatic tubes in a folded position before being sewed at the ends; Fig. 20, an end elevation of the pneumatic tube as disclosed in Fig. 19; Fig. 21, a plan elevation of one of the pneumatic tubes inflated; Fig. 22, an end elevation of the pneumatic tube as disclosed in Fig. 21; and Fig. 23, a partial view of the deck and tube assembly.

Similar numerals refer to similar parts throughout the several views.

The bags or containers 1 are made with closed round ends and contain integrally therewith the rubber tubes 2. The rubber tubes 2 are each provided with air valves 4 for inflation purposes. The air valves 4 may be placed off the exact center of the bags 4 so that the air valves 4 will not be exactly opposite each other when in their assembled positions as shown in Fig. 1. The rubber tubes 2 may also be provided with safety air valves 5, as shown in Figs. 1 and 2, which will prevent the rubber tubes 2 from being inflated beyond a pre-determined air pressure. The deck or platform of the raft is constructed with the wooden members 6 which are completely covered on their upper surfaces by the fabric cover 7 which is formed with a plurality of slots 8 on each of its sides, the width of the tongues 9 between the slots 8 being approximately the width of the wooden members 6. The tongues 9 are folded over the ends of the wooden members 6 between said wooden members 6 and the top of the bags 1, as shown in Figs. 2, 7, and 8. The tongues 9 may be cemented or otherwise suitably fastened to the ends of the wooden members 6. Sufficient material of the fabric cover 7 may be provided to be folded over and suitably fastened around the outer longitudinal sides of the wooden members 6 as at 12, this overlapping material being designated at 13 in Fig. 6. The outer edges of the fabric cover 7 may be folded and stitched as at 14 to eliminate raw edges and prevent ravelling. It is to be noted that all of the upper and outer exposed sides and ends of the wooden members 6 are thus completely covered thus preventing injurious contact of rough edges to parties using the deck of the raft for diving or other swimming sports. Also the tongues 9 will prevent the wooden members 6 from chafing the bags 1. It is to be noted that the ends of the deck are placed at some distance from the ends of the bags 1 so that, when a person is climbing from the water upon the deck, the buoyancy of the ends beyond the deck will tend to keep the raft from tipping to any dangerous degree.

The approximate water line 15, in Fig. 3, discloses the approximate position of the raft in the water when the raft is not loaded. To the rounded ends of the bags 1 are suitably attached the straps 16 to which are fastened the buckles 17. The straps 18 are suitably attached to the fabric cover 7 and by engagement with the buckles 17 permit the fabric cover 7 to be stretched and maintained in its longitudinal position on the bags 1. To the tongues 9 located at each end of the fabric cover 7 of the deck are suitably attached the straps 19. The support members 20, as shown in Fig. 3, are rigidly supported from the wooden members 6, located adjacent the straps 19 at the ends of the deck, by the angle brackets 21 which may be permanently attached to the support members 20 by the bolts 22 and removably attached to the wooden members 6 by the bolts 23 and the wing nuts 24. The upper end of the support members 20 together with the angle brackets 21 are thus held tight against the wooden members 6, thus retaining the support members in fixed positions. To the lower ends of the support members 20, which extend to a position approximately in line with the bottom of the fabric bags 1, are suitably attached the angle brackets 25 to which may be permanently fastened the short straps 26 to which in turn are attached the buckles 27.

The operation of the straps 19 through the buckles 27 will enable the bags 1 to be held lightly against the outer sides of the support members 20, this causing the bags 1 to slightly deform to a flatted portion, as indicated at 28 in Fig. 3, thus maintaining the bags from rolling in their straps as has been found the case, as soon as the straps become wet in the water, where the ordinary method of fastening has been employed. It is to be noted that maintaining of the bags 1 from loosening or turning is materially aided by the straps causing the bags 1 to be wedged into the open angles formed by the wooden members 6 and the support members 20. The intermediate straps 29 are suitably attached, at their outside ends, to the intermediate tongues 9 of the deck, and operate through the buckles 30, as disclosed in Fig. 8, which are attached to the short straps 31 which are in turn suitably attached to the angle brackets 32 which may be permanently attached by the bolts 33, to the under side of certain of the wooden members 6. To enable swimmers to readily climb out of the water on to the deck of the raft, the ladder arms 34 are pivotally mounted on the bolts 35 which are suitably mounted in the support members 20. The lower ends of the ladder arms 34 are provided with countersunk portions 36 into which fit the ends of the ladder rung 37. A rod 38 extends through the ladder rung member 37 and the ladder arms 34. The rod 38 may be threaded to engage the wing nut 39 thus permitting the ladder members to be tightly clamped together and at the same time allowing for the ready disassembly of the ladder rung 37 from the ladder arms 34.

The upper hinge arms 40 are pivotally mounted on the bolts 41, disclosed in detail in Figs. 11, 12, and 13, and in the assemblies in Figs. 2 and 3, which are in turn retained in the angular brackets 42, together with the upper arms 40, by the wing nut 43. The angular brackets 42 may be attached to certain of the wooden members 6 by suitable members passing through the holes 44 in said brackets. The upper hinge arms 40 are pivotally attached, by suitable means, at 45, to the lower hinge arms 46, said lower hinge arms 46 being pivotally attached, by suitable means, at 47, to the ladder arms 34. The lower hinge arm 46 is provided with an overlapping extension 48 which engages a portion of the upper hinge arm 40 when said hinge arms are in the positions disclosed in Fig. 2. It will be noted that when in the positions as disclosed in Fig. 2, the pivotal point 45 is slightly below the extended line 53 passing through the pivotal centers 41 and 47, thus allowing the hinge arms 46 and 40 to position the ladder arms 34 so that the ladder rungs 37 will be in extended positions beyond the ends of the deck.

The weight of the ladder arms 34 and the ladder rung 38 will hold the hinge arms 40 and 46 in the positions as shown in Fig. 2, until it is desired to raise the hinge arms 40 and 46 and their common pivotal point 45 above the extended line 53, when the hinge arms 40 and 46 together with the ladder arms 34 and the ladder rung 37 may be pivotally moved to the folded positions as shown by the dotted lines in Fig. 7. The pivotal attaching members of the ladder mechanism can be constructed with the desired operating clearances so that the folded ladder will remain in its folded positions, as shown in Fig. 7, thus facilitating the handling and transporting of the assembled raft until the raft is placed in the water, when the ladder mechanism can be readily folded to the positions shown in Figs. 2 and 3.

It is to be noted that the extended positions of the ladder rungs 37 beyond the deck of the raft will enable a swimmer to more easily climb upon the raft than if the ladder rung were flush with or inside of the ends of the deck.

It is to be noted that after the bags 1 are inflated by means of the rubber tubes 2 and fastened in position by the straps 19 and 29, an additional pressure of air, within the rubber tubes 2 may be added, the safety air valve being graduated for the desired total amount of pressure, to cause the bags 1 to slightly bulge around the straps 19 and 29, as shown in Fig. 2, thus more firmly maintaining the bags 1 from being displaced when the straps 19 and 29 may become stretched after being soaked in water.

It is to be noted that the wooden members 6 are made of relatively narrow and thin stock each having end portions resting on the bags 1. Each of the wooden members are thus flexible between their supporting portions which allows the supporting portions of the wooden members 6 to always maintain contact with the supporting bags 1 when said supporting bags are flexibly displaced due to the concentration of loads at any points on the deck. Thus the wooden members 6 can be made of light weight material of relatively small section, which is a distinct advantage in a knockdown raft due to the lesser weight and bulk in handling and transportation, at the same time providing sufficient strength for supporting several people on a relatively small size raft. The wooden members 6 are placed as close together as will permit the deck member assembly to be rolled up as shown in Fig. 5, this close grouping of the deck members 6 thereby providing exceptional load carrying ability with minimum weight and bulk. The bags or containers 1 which form the pneumatic supporting members of our raft are constructed by first cutting a piece of canvas or other suitable fabric 52 as shown in Fig. 16. The fabric 52 is then impregnated, on one of its sides, with a layer of rubber composition, which forms the rubber tube 2 as shown in the enlarged section Fig. 18. Then the fabric 52 is sewed along the seam 54 to convert the fabric 52 into a tube with the layer of rubber composition or tube 2 on the inside. Then soapstone is rubbed or put all over the inside of the layer of rubber composition or tube 2 except for a short distance at each of its ends. The fabric 52 is folded as shown, in Fig. 19, and its ends sewed as shown at 55. The ends 55 may be retained by any suitable clamping or holding method so that they are closed tight. Then the container 1 is placed within a steel tube which is maintained in a heated state after which the container 1 is inflated with steam to effect a cured condition of the rubber composition 2 except along the ends 55 where it will be vulcanized. The container 1 is now ready for use as a supporting member in the raft.

It is to be further understood that our invention can be utilized as a boat by the application of suitable oars and oar locks and also by the application of small internal combustion engines to provide propulsion means.

We claim:

1. In a raft, the combination of a plurality of pneumatic cylinders, a deck member engaging said plurality of pneumatic tubes, said deck member being provided with a plurality of members attached to and extending longitudinally with said pneumatic tubes, said deck member being further provided with a plurality of members circumferentially engaging said pneumatic tubes, and ladder means supported from said deck member, said ladder means extending below said deck means.

2. In a raft, the combination of a plurality of support members and a member engaging the top surfaces of said support members, said member being provided with tongue portions engaging the ends of said support members.

3. In a raft, the combination of a pair of buoyant members, a plurality of support members supported on said pair of buoyant members, a deck member covering the upper surfaces of said support members, said deck member fastening said support members together, adjustable members extending longitudinally of said buoyant members, said adjustable members connecting said deck member to said buoyant members, and adjustable members encircling said buoyant members, said last mentioned adjustable members being connected with said deck member and said support members.

4. In a raft, the combination of a deck member, support members below said deck member, said support members being removably attached to said deck member, buoyant members engaging said deck member and said support members, and adjustable means engaging said buoyant members, said adjustable means being connected with said deck member and said support members.

5. In a raft, the combination of a buoyant member, a deck member engaging said buoyant member, and ladder means suitably connected with said deck member and said buoyant member, said ladder means extending below and beyond the sides of said deck member.

6. In a raft, the combination of buoyant members, a deck member removably attached to said buoyant members, support members removably attached to said deck member, and a ladder mechanism removably attached to said support members and said deck member.

7. In a raft, the combination of a deck member, buoyant members attached to said deck member, a ladder mechanism pivotally supported beneath said deck member, and pivotally mounted means for fastening said ladder mechanism in a plurality of positions.

8. In a raft, the combination of a deck member, a ladder pivotally mounted beneath said deck member, and folding means pivotally connecting said ladder and said deck member, said folding means permitting said ladder to be folded in a position parallel with said deck member.

9. In a raft, the combination of a deck member and a ladder, said ladder being removably connected with said deck member, said ladder being further provided with a removable rung member, together with folding means pivotally connected to said ladder, said folding means being further pivotally connected to said deck member.

10. In a raft, the combination of a deck member, support members removably attached to and extending below said deck member, ladder arms pivotally attached to said support members, a rung member removably attached between said ladder arms, and a pair of hinged members pivotally attached to each of said ladder arms, said pair of hinged members being further removably and pivotally attached to said deck member.

11. In a raft, the combination of a buoyant member, a plurality of deck members, and means covering the upper surfaces of said deck members supported on said buoyant member, said means further covering a partial portion of the lower surfaces of said deck members, said means extending between said deck members and said buoyant member to prevent said deck members from chafing said buoyant member.

12. In a raft, the combination of a plurality of members with spaces therebetween, and a flexible covering for said members, said flexible covering being attached to said members so as to enable said flexible member to constitute the sole means for spacing said members.

13. In a raft, the combination of a pair of buoyant members, a deck unit resting on said buoyant members, said deck unit comprising a plurality of relatively rigid members covered by a single flat member forming the uppermost supporting portion of said deck unit, and means for supporting a person in the water adjacent said deck unit, said means being fixedly positioned relative to said deck unit.

14. In a raft, the combination of pair of buoyant members, a deck member engaging the top of said buoyant members, means for fastening said deck member to said buoyant members, and means for supporting a person when mounting from the water to said deck member, said last mentioned means being connected to said first mentioned means for fastening said deck member to said buoyant members.

15. In a raft, the combination of a deck member and ladder mechanism suitably attached to said deck member, said ladder mechanism comprising means to enable said ladder mechanism to be folded in a horizontal position under said deck member.

16. In a raft, the combination of a pair of buoyant members, a deck member suitably mounted on said buoyant members to allow adjacent end portions of said buoyant members to be uncovered by said deck member, the uncovered adjacent end portions of said buoyant members being unconnected throughout their uncovered adjacent end portions, ladder means suitably supported below said deck member, said ladder means being located adjacent the unconnected adjacent end portions of said buoyant members uncovered by said deck member.

17. In a raft, the combination of a pair of buoyant members, a horizontal deck member covering the central portions of said buoyant members, said horizontal deck member comprising a flat fabric cover constituting the extreme uppermost member of said horizontal deck member, said buoyant members thereby having a substantial portion at their ends uncovered by said deck member, and means for enabling a person to climb to the top of said deck member, said means being located adjacent the ends of said buoyant members uncovered by said deck member, to permit the person, climbing to the top of said deck member, to be simultaneously supported on the ends of said buoyant members uncovered by said deck member, and on said means, said means being located entirely below said horizontal deck member.

18. In a raft, a deck member comprising a flexible member having tongue portions with relatively narrow spaces therebetween together with load carrying members suitably attached to the tongue portions of said flexible member.

19. In a raft, a deck member, a pair of pivotally mounted members below said deck member, each of said pair of pivotally mounted members being provided with a countersunk portion, a rung member supported in the countersunk portions of said pair of pivotally mounted members, and means for locking said rung member in the countersunk portions of said pair of pivotally mounted members, said means extending through said rung member and said pair of pivotally mounted members.

20. In a raft, a pair of pivotally supported ladder arms, an arm pivotally connected to a supporting member, and an intermediate arm pivotally connected to one of said ladder arms and to said second mentioned arm, said last mentioned intermediate arm being provided with an extension portion for engaging said first mentioned arm to prevent said first mentioned arm and said last mentioned intermediate arm from pivotally moving beyond a pre-determined position.

21. In a raft, the combination of a plurality of load carrying members, support members suitably attached to the lower side of certain of said load carrying members, buoyant members supporting said load carrying members and engaging said support members, a flexible member covering the upper surfaces of said plurality of load carrying members, and flexible members connected to said first mentioned flexible member and said support members, said last mentioned flexible members engaging said buoyant members.

22. In a raft, the combination of buoyant members, a plurality of load carrying members supported on said buoyant members, support members suitably connected to the under side of certain of said load carrying members, a flexible member covering the upper side of said load carrying members, members suitably connected to said flexible member and said support members, said last mentioned members engaging said buoyant members, and intermediate members suitably connected to said flexible member covering said load carrying members and to the under side of certain of said load carrying members, said last mentioned intermediate members engaging said buoyant members.

23. In a raft, the combination of buoyant members, a plurality of horizontal load carrying members supported on said buoyant members, a horizontal flexible member covering the upper sides of said load carrying members, means for mounting to the top of said flexible member on said load carrying members, said means being suitably supported from the under side of said horizontal load carrying members, and means for folding said first mentioned means in a protected position between said buoyant members.

24. In a raft, the combination of a plurality of buoyant members, a deck upper member attached to said buoyant members at a plurality of places between the ends of said buoyant members, and a plurality of supporting members under said deck upper member, said supporting members being attached to said deck upper member, said supporting members being maintained in spaced positions by said deck upper member.

25. In a raft, the combination of a pair of buoyant members, a plurality of deck members, and flexible means covering said deck members, said flexible means being provided with portions extending between said deck members and said buoyant members, said portions of said flexible means engaging said buoyant members, said flexible means being attached to said deck members.

26. In a raft, the combination of buoyant means, a plurality of supporting members above said buoyant means, and flexible means covering the upper surface of said supporting member, said flexible means being provided with portions extending under the ends of said supporting members, the portions of said flexible means extending under the ends of said supporting members further engaging said buoyant means, said flexible means constituting the uppermost portion of the raft.

27. In a raft, the combination of buoyant means, a deck member supported on said buoyant means, a pair of intersecting strap members attached approximately at each corner of said deck member, one of said strap members circumferentially engaging said buoyant means, the other of said strap members being suitably attached to the upper side of said buoyant means.

28. In a raft, the combination of a pair of buoyant members, a deck member on said buoyant members, and a valve member in each of said buoyant members, each of said valve members being located approximately in a common plane under said deck member, each of said valve members being located on the inner side of said buoyant members when assembled in the raft.

29. In a raft, the combination of a buoyant member, a deck member having a flexible covering, and a pair of members connecting said buoyant member and said deck member together, one of said pair of members extending longitudinally of said buoyant member, one of said pair of members extending circumferentially of said buoyant member, said pair of members being suitably attached to the flexible covering of said deck member.

JOHN W. TATTER.
GEORGE B. INGERSOLL.